United States Patent
Robinson et al.

(10) Patent No.: US 6,843,458 B1
(45) Date of Patent: Jan. 18, 2005

(54) CUP HOLDER

(76) Inventors: Todd M. Robinson, 2481 Lakewood Rd., Four Oaks, NC (US) 27524; Inger Herrigas, 5104 Shady La., San Jose, CA (US) 95129

(*) Notice: Subject to any disclaimer, the term of this patent is extended or adjusted under 35 U.S.C. 154(b) by 0 days.

(21) Appl. No.: 10/733,572

(22) Filed: Dec. 12, 2003

(51) Int. Cl.$^7$ ................................. A47K 1/08
(52) U.S. Cl. ................................. 248/311.2; 248/314
(58) Field of Search ........................ 248/311.2, 314, 248/316.3, 309.1, 309.2, 346.06, 346.05, 346.02; 224/926

(56) References Cited

U.S. PATENT DOCUMENTS

| | | | |
|---|---|---|---|
| 2,264,489 A | 12/1941 | Tiegler et al. | |
| 2,426,995 A | * 9/1947 | Gibbs | 312/71 |
| 2,956,687 A | 10/1960 | Robichaud | |
| 2,963,256 A | 12/1960 | Borah | |
| 2,973,601 A | 3/1961 | McKnight | |
| 3,028,702 A | 4/1962 | St. Cyr | |
| 3,659,535 A | * 5/1972 | Cerney et al. | 108/136 |
| 3,999,261 A | 12/1976 | Bingaman | |
| 4,015,940 A | 4/1977 | Conlon | |
| 4,312,716 A | 1/1982 | Maschler et al. | |
| 4,969,618 A | 11/1990 | Thompson | |
| 5,217,196 A | 6/1993 | Morell | |
| 5,634,621 A | 6/1997 | Jankovic | |
| 5,664,367 A | * 9/1997 | Huang | 47/40 |
| 5,839,710 A | 11/1998 | Hubbard | |
| 6,070,844 A | 6/2000 | Salenbauch et al. | |
| 6,302,364 B1 | 10/2001 | Chiueh | |
| 6,581,888 B1 | 6/2003 | Castillo | |
| 6,629,616 B1 | 10/2003 | Heinzle | |

FOREIGN PATENT DOCUMENTS

| | | | | |
|---|---|---|---|---|
| JP | 60185606 A | * 9/1985 | | B60C/11/16 |
| JP | 7-227789 A | 8/1995 | | |
| JP | 10-127459 A | 5/1998 | | |
| JP | 11-165573 A | 6/1999 | | |
| JP | 2001-63439 A | 3/2001 | | |

* cited by examiner

*Primary Examiner*—Ramon O Ramirez
(74) *Attorney, Agent, or Firm*—Richard C. Litman

(57) ABSTRACT

A cup holder device is a cylindrical container comprising a clustered arrangement of multiple abutting spring-containing two-piece pins vertically grouped within the cylindrical container for accepting and holding any size cup which depresses the affected pins. Two horizontal apertured walls support the pins and include small drain holes in the peripheral edges.

5 Claims, 2 Drawing Sheets

CUP HOLDER

BACKGROUND OF THE INVENTION

1. Field of the Invention

The present invention relates generally to container holders. More specifically, the invention is a cup holder that is capable of securely holding a variety of cup sizes and shapes.

2. Description of the Related Art

The related art of interest describes various cup holders, but none discloses the present invention. There is a need for an effective, versatile cup holder rather than the conventional solid based and standard sized cup holders. The related art will be discussed in the relative order of perceived relevance to the present invention.

Japan Patent Publication No. 7-227789 A published on Aug. 29, 1995, for Katsuhiko Sugito et al. describes a holding device comprising a number of parallel vertical pins arranged in a spiral on a supporting frame and held in tension by a coil spring attached to a winding motor. The device is distinguishable for requiring a tension on the pins applied by a motor.

Japan Patent Publication No. 10-127459 A published on May 19, 1998, for Kazumasa Takeuchi describes in FIG. 25 a container holder for determining the residual content of liquid in the container having concentrically disposed holding plates supported by individual springs. The inner plate is intended to hold a container smaller in diameter, in which case the outer plate serves as a lateral support for the container. The outer plate is intended to hold a container larger in diameter with the outer casing providing lateral support to the container. The device is distinguishable for requiring holding plates supported by individual springs.

U.S. Pat. No. 4,015,940 issued on Apr. 5, 1977, to Daniel R. Conlon describes a holding device for laboratory ware comprising a torus-shaped helical spring affixed to a disklike cork pad on a circular base. The device is distinguishable for requiring a torus-shaped helical spring.

U.S. Pat. No. 5,634,621 issued on Jun. 3, 1997, to Tomislav Jankovic describes a three-stage dual cup holder apparatus for a vehicle comprising a housing having a cavity with a base support therein, and a gap formed therebetween. A pair of opposing support members are positioned within the gap in a stowed position, and are moved vertically upwardly and horizontally outwardly through at least two positions of different height and horizontal spacing. The apparatus is distinguishable for requiring dual holders and a pair of opposing supporting members.

An Amazon.com publication entitled "Tools & Hardware: Gator Grip ETC-200MO Universal Socket" shows a socket tool describing a socket head having depressible pins to adjust apparently to any nut or bolt head. The device is distinguishable for requiring a socket head tool.

U.S. Pat. No. 2,264,489 issued on Dec. 2, 1941, to Donald W. Tiegler et al. describes a bottle support device comprising a large circular rubber mat having a smaller circular rubber mat attached. The larger mat has one diametrical line and parallel perpendicular lines for enclosing a bottle at its bottom. The device is distinguishable for requiring a severed mat portion for securing fingers.

U.S. Pat. No. 2,956,687 issued on Oct. 18, 1960, to Mabel A. Robichaud describes a bottle holder device comprising an open topped box having two parallel flanges on top containing either sponge rubber or a plastic foam material extending out to meet each other in the center to hold the bottle upright. The device is distinguishable for requiring a box with either sponge rubber or plastic foam supports.

U.S. Pat. No. 2,963,256 issued on Dec. 6, 1960, to John E. Borah describes an article holder for drinking glasses, mixing bowls, flower pots, ink and paste bottles, condiment containers and the like comprising a rubber disc-shaped body having a concave bottom surface, a flat upper interior bottom surface, and a circular wall. The holder device is distinguishable for requiring a circular cup shape with a concave bottom surface.

U.S. Pat. No. 3,028,702 issued on Apr. 10, 1962, to Napolean J. St. Cyr describes a non-tipping drinking glass coaster or holder comprising a metal or plastic cup suspended in a metal or plastic cup by spring fingers. A fabric sack surrounds the cup receptacle and holds a loose weight such as beans, sand, gravel or shot. The coaster device is distinguishable for requiring a weighted bag surrounding the cup receptacle.

U.S. Pat. No. 3,999,261 issued on Dec. 28, 1976, to Harold J. Bingaman describes a pad-type jar gripper device comprising a frying pan shaped device containing a depressed bed filled with stubby gripper fingers. The bottom surface of the pan has four cross-located vacuum domes and a concavity filled with pliable material. The device is distinguishable for requiring a handle and a depressed bed of gripper fingers.

U.S. Pat. No. 4,969,618 issued on Nov. 13, 1990, to Steve Thompson describes a container holder comprising a circular base member having four outwardly spaced leg support portions and four upright cup support members having a foam padded face for holding a cup. The device is used on a flat surface such as the floor of a van or truck. The device is distinguishable for requiring four padded cup support members.

U.S. Pat. No. 5,217,196 issued on Jun. 8, 1993, to Alice R. Morell describes a mixing bowl stabilizer device comprising a contoured endless coil configuration for overlapping engagement with the bowl. The device is distinguishable for requiring a contoured endless coil configuration.

U.S. Pat. No. 5,839,710 issued on Nov. 24, 1998, to Gary L. Hubbard describes a concealable variable size vehicle container(s) holder having two unitized flexible rubber-coated metal or polymeric bands, and that can be located in the dashboard or between the front seats. The container holder apparently has an ashtray in front. The device is distinguishable for requiring a tray with flexible bands to hold the cups.

U.S. Pat. No. 6,070,844 issued on Jun. 6, 2000, to Hermann J. Salenbauch et al. describes a variable size vehicle beverage container holder device comprising hollow cylindrical upper and lower parts connected by a plurality of rod-shaped connecting rods which are tilted by rotation of one of the parts to reduce the inner diameter to clamp the beverage container. The device is distinguishable for requiring adjustment of the clamp.

U.S. Pat. No. 6,302,364 B1 issued on Oct. 16, 2001, to Theresa T. Chiueh describes a pneumatic container holder device comprises a planar surface installed device having a pneumatically operated bladder member to selectively adjust the size in diameter of the container holder. The device is distinguishable for requiring pneumatic means for adjustment of the cup holder.

U.S. Pat. No. 6,581,888 B1 issued on Jun. 24, 2003, to Kenneth A. Castillo describes an irregular-surface glass cup, coffee mug, or stemware holder comprising a base portion having an outer covering holding a weighted mass to surround the base of the cup and the like. The device is distinguishable for requiring a weighted base portion.

Japan Patent Publication No. 11-165573 A published on Jun. 22, 1999, for Kazufumi Saito describes a container holding "tool" device comprising a cabinet attached to the rear of the front seatback which has a hinged cover rotating down to expose two circular projecting pins, and the vertical rear portion exposing a pair of holding stoppers that spring out to a horizontal position. The device is distinguishable for requiring a hinged cover and cup holding circular pins.

Japan Patent Publication No. 2001-63439 A published on Mar. 13, 2001, for Yoshiaki Hamamoto describes an on-vehicle cup holder mounted on the dashboard comprises six horizontal sheets having different cup holding holes. The cup size fitting sheet is slid out for use. The device is distinguishable for requiring a set of horizontal cup holding sheets.

None of the above inventions and patents, taken either singly or in combination, is seen to describe the instant invention as claimed. Thus, a cup holder solving the aforementioned problems is desired.

SUMMARY OF THE INVENTION

The cup holder device comprises a cylindrical container containing a clustered arrangement of multiple abutting spring-containing two-piece pins vertically grouped within the cylindrical container and stabilized by two horizontal apertured plates for accepting and holding any size cup which depresses the affected pins. The outer three rows adjacent the cylindrical container in the two apertured plates also have small drainage apertures between them to allow any spilled beverage to drain to the bottom of the device.

Accordingly, it is a principal object of the invention to provide a cup holder device.

It is another object of the invention to provide a cup holder device having a clustered arrangement of vertical pins.

It is a further object of the invention to provide a cup holder device having spring-containing depressible pins.

Still another object of the invention is to provide a cup holder device having a cup support frame to fit, for example, a center hump of a vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
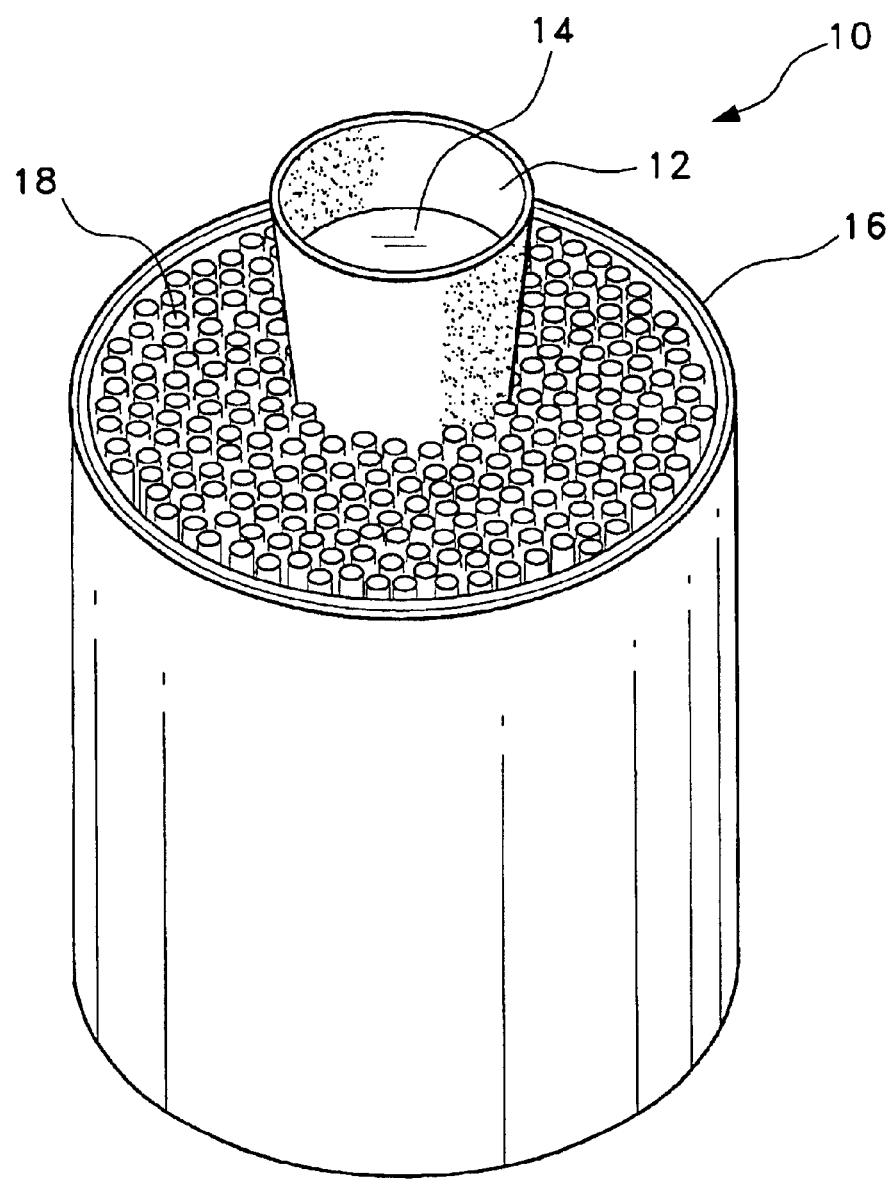
FIG. 1 is an environmental, perspective view of a cup holder device containing a cup of a liquid according to the present invention.
Figure 2:
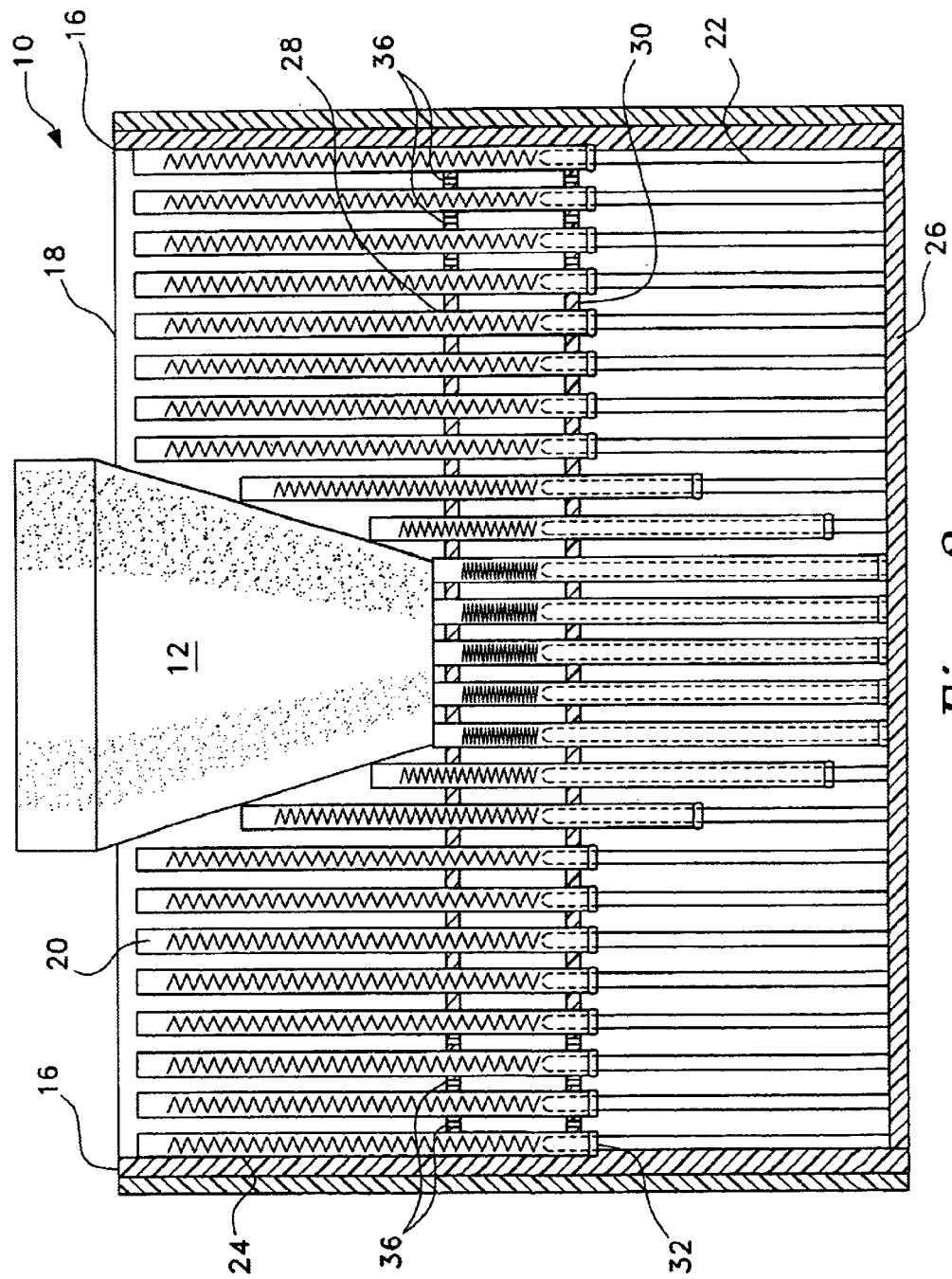
FIG. 2 is a cross-sectional view of the cup holder device.

The present invention is directed in FIGS. 1 and 2 to a device 10 to hold a cup 12 of liquid 14 by a housing 11.

The cup holder device 10 comprises a cylindrical container 16 containing an array of abutting elongate and compressible pins 18 oriented vertically and parallel to each other. The pins 18 will not be in straight rows or columns, but will be staggered slightly allowing for maximum surface contact. Each pin 18 consists of an upper cylindrical pin element 20 that overlaps frictionally a solid lower pin element 22, and is separated by a spring 24 housed in the upper pin element 20. Each solid lower pin element 22 is based securely on the bottom wall 26 of the device 10.

A first horizontal upper and apertured wall 28 supports each upper pin element 20. A second horizontal lower and apertured wall 30 supports the bottom end 32 of the upper pin element 20. These upper and lower apertured walls 28 and 30 act to maintain and stabilize the elongate pins 18 inside the cup holder device 10. Both walls 28 and 30 have small peripheral drain holes 36, e.g., three, in the peripheral region adjacent the upright wall of the cylindrical container 16.

The cup holder device 10 can be made of stainless steel parts for durability and rustproof properties.

Thus, an efficient and durable cup holder device has been shown.

It should be noted that the device 10 can be mounted in a wide variety of places such as, for example, in a vehicle in various locations such as on the dashboard, on the inside surface of the doors, and on the rear surfaces of the front seats.

It is to be understood that the present invention is not limited to the embodiment described above, but encompasses any and all embodiments within the scope of the following claims.

What is claimed is:

1. A cup holder device, comprising:
    a cylindrical container having a bottom wall and an open top;
    an array of elongate pins oriented vertically and parallel to each other and confined in said container;
    each pin comprising a cylindrical upper pin element and a solid lower pin element, said upper pin element frictionally overlapping said lower pin element, said upper and lower pin elements being separated by a spring in the upper pin element;
    each solid lower pin element engaging said bottom wall;
    whereby a drinking cup containing liquid positioned on the upper pin elements is maintained in a stable position.

2. The cup holder device according to claim 1, further comprising a first horizontal apertured wall supporting a median portion of each top pin element.

3. The cup holder device according to claim 1, further comprising additional smaller apertures in a peripheral region of the first horizontal apertured wall providing drainage.

4. The cup holder device according to claim 3, further comprising a second horizontal apertured wall supporting a bottom open end of each top pin element.

5. The cup holder device according to claim 4, further comprising additional smaller apertures in peripheral regions of the second horizontal apertured wall providing drainage.

* * * * *